United States Patent [19]
Lisiecki et al.

[11] Patent Number: 5,778,484
[45] Date of Patent: Jul. 14, 1998

[54] WINDSCREEN WIPER FOR A MOTOR VEHICLE HAVING IMPROVED ELASTIC RETURN MEANS

[75] Inventors: Bruno Lisiecki, Chatillon; Alain Viaene, Creil, both of France

[73] Assignee: Valeo Systemes d'Essuyage, La Verriere, France

[21] Appl. No.: 730,234

[22] Filed: Oct. 15, 1996

[30] Foreign Application Priority Data

Oct. 16, 1995 [FR] France ............................ 95 12419

[51] Int. Cl.$^6$ ............................ B60S 1/32; B60S 1/34
[52] U.S. Cl. ............................ 15/250.352; 15/250.351
[58] Field of Search .................. 15/250.351, 250.352, 15/250.31, 250.202, 250.203, 250.34

[56] References Cited

U.S. PATENT DOCUMENTS

| | | | |
|---|---|---|---|
| 3,076,992 | 2/1963 | Reese | 15/250.351 |
| 3,088,154 | 5/1963 | Riester et al. | 15/250.34 |
| 4,497,084 | 2/1985 | Auzolat | 15/250.352 |

FOREIGN PATENT DOCUMENTS

| | | |
|---|---|---|
| 2 149 651 | 11/1984 | United Kingdom. |
| 2 163 948 | 8/1985 | United Kingdom. |
| 2 188 536 | 4/1987 | United Kingdom. |

*Primary Examiner*—Gary K. Graham
*Attorney, Agent, or Firm*—Morgan & Finnegan, L.L.P.

[57] ABSTRACT

The invention concerns a windscreen wiper for a motor vehicle, having a windscreen-wiper arm, articulated on a drive head, and of the type in which elastic return means, having a spring attached to the drive head and to a lever mounted pivotally on the drive head, force the arm towards a wiping position, wherein the lever has a longitudinal nose, which extends forwards from a longitudinal front end of the lever opposite to its pivoting rear end, wherein the arm has a crossmember which connects the two lateral wings of the arm and wherein, when the arm is in the wiping position, the nose of the lever extends between the upper web of the arm and the crossmember on which it bears under the action of the spring.

12 Claims, 3 Drawing Sheets

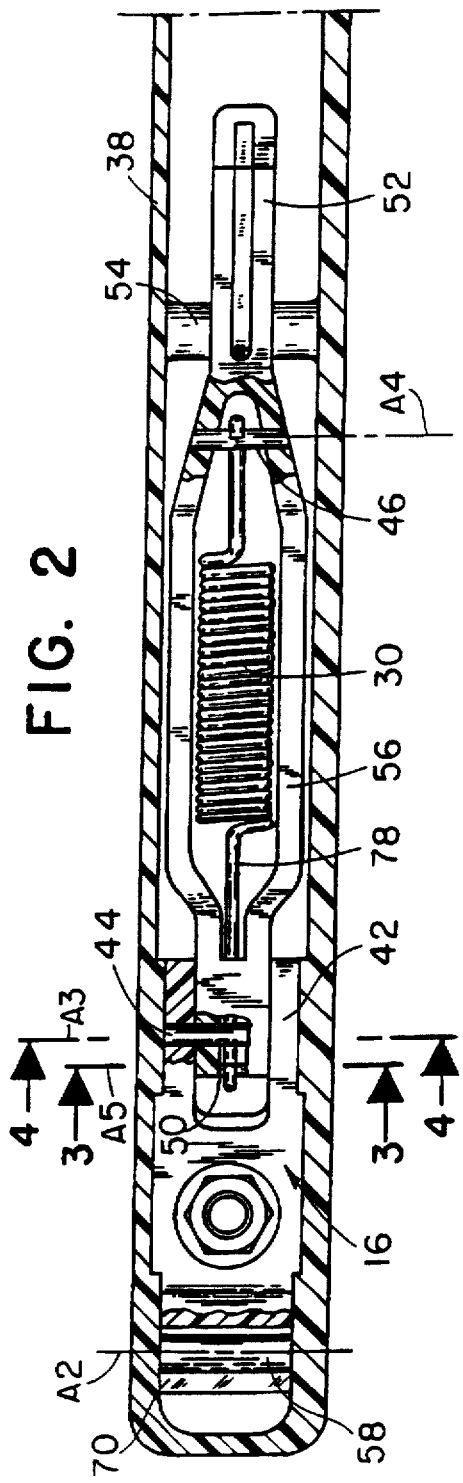
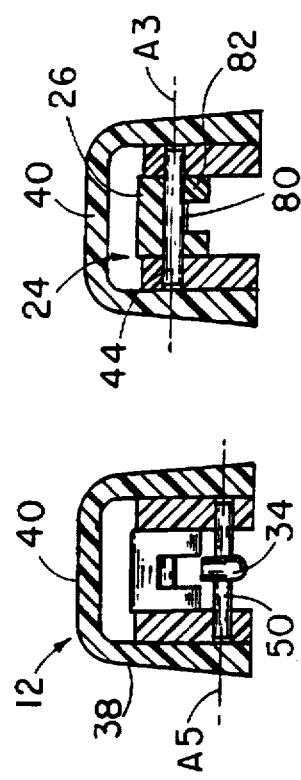

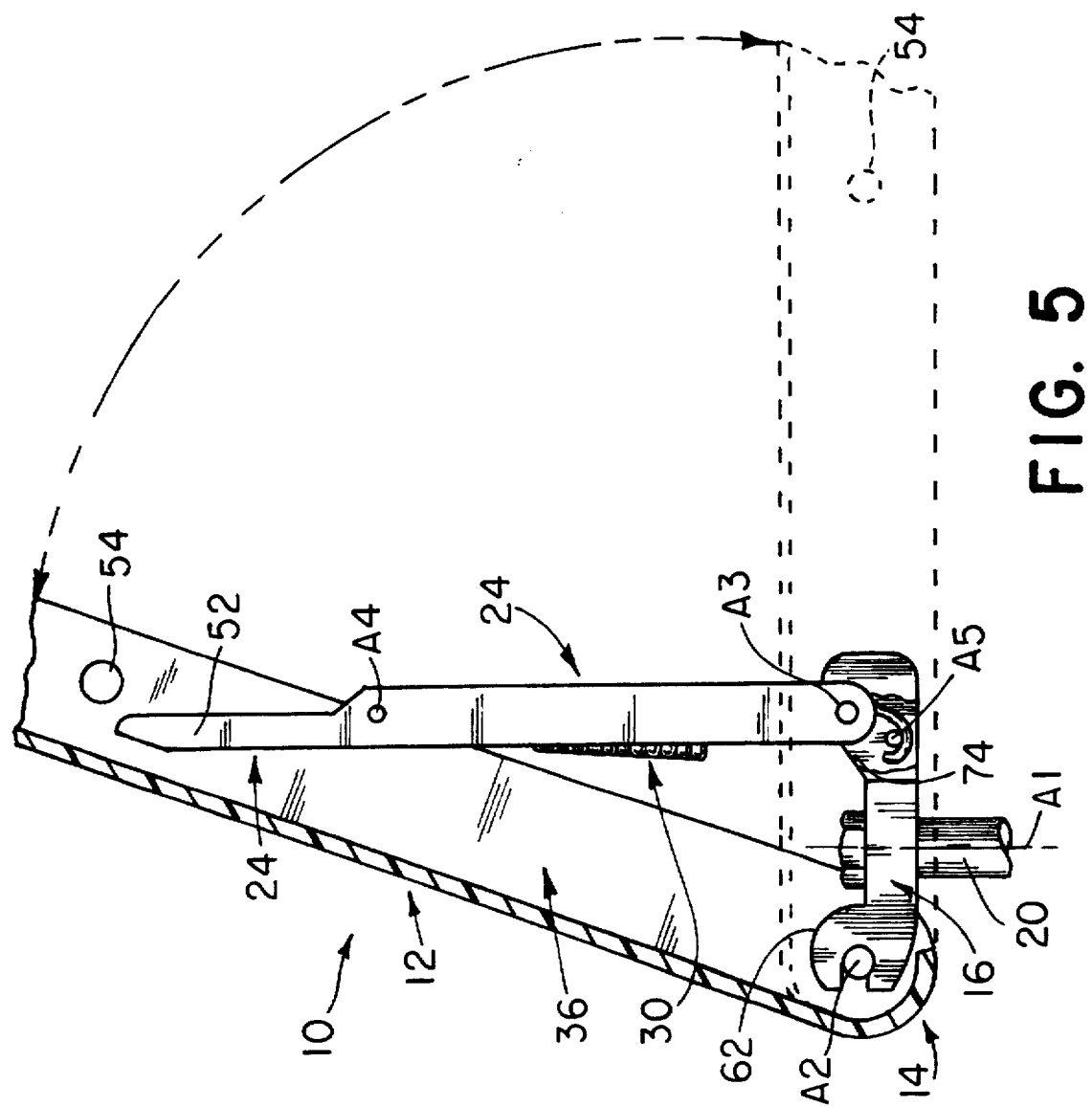

WINDSCREEN WIPER FOR A MOTOR VEHICLE HAVING IMPROVED ELASTIC RETURN MEANS

FIELD OF THE INVENTION

The invention concerns a windscreen wiper for a motor vehicle having improved elastic return means with a view to their standardisation and more particularly proposes a windscreen wiper for a motor vehicle of the type

BACKGROUND OF THE INVENTION

At present all vehicles have windscreen wipers whose shape and size are adapted to the surface of the window to be wiped and to the location of the device for driving in alternate sweeping motion.

The result is that, even for vehicles of a similar size, each windscreen wiper is entirely specific, whether it be the windscreen wiper arm, the drive head or the elastic return means.

It is clear that it is indeed desirable to adapt the arm and the drive head for each vehicle, in order to sweep over the largest possible surface area of the window to be wiped in accordance with the constraints regarding the location of the windscreen wiper, and also in order to make the windscreen wiper blend in as well as possible with the general appearance of the vehicle.

In order to obtain an optimal wiping of the window to be wiped, it is necessary to control the wiping pressure of the windscreen wiper blade against the window to be wiped, this pressure being determined by the elastic return means.

However, as windscreen wipers differ from one vehicle model to another, it is also necessary to provide springs of varying shape, length and stiffness to adapt to different windscreen wiper models.

Currently, each vehicle is thus fitted with its own specific wiping pressure spring, which leads to considerable production and storage costs.

DISCUSSION OF THE INVENTION

With the aim of providing a solution to this problem, the invention proposes a windscreen wiper of the type in which a windscreen-wiper arm is articulated by a rear longitudinal end about a transverse axis between a wiping position and a disengaged position, on a head for driving the windscreen wiper in alternate sweeping motions, of the type in which the longitudinal articulation end of the arm has two parallel longitudinal lateral wings joined by an upper transverse web so as to form a cavity which is open to face a window to be wiped, of the type in which are provided elastic return means arranged longitudinally, in the cavity of the arm, between the drive head and the arm, in order to force the latter towards its wiping position bearing against the window, and of the type in which the elastic return means comprise a spring, for example a helical extension spring which is attached, by a rear end, to the drive head and, by a front end, to a lever mounted so as to pivot, between an operating position and a raised position, on the drive head about a transverse axis wherein the lever has a longitudinal nose which extends forwards from a front longitudinal end of the lever opposite to its rear pivoting end, wherein the arm has a crossmember which connects the two lateral wings of the arm, and wherein, when the arm is in the wiping position, the nose of the lever extends between the web of the arm and the crossmember on which it bears under the action of the spring.

According to other characteristics of the invention:

the drive head has two longitudinal sides which extend forwards and between which the rear pivoting end of the lever is received;

the rear end of the lever is mounted in an articulated manner on a cylindrical transverse bar which connects the two sides of the drive head;

for the attachment of the rear end of the spring, a transverse rod is provided which connects the two sides of the drive head and which is arranged longitudinally between the axis of articulation of the lever on the drive head and the window to be wiped;

the transverse rod is arranged on the drive head behind the axis of articulation of the lever so that a neutral angular position of the lever exists, between its operating position and raised position, in which the attachment points of the spring and the axis of articulation of the lever are aligned and so that, when the lever is raised, from its operating position corresponding to the wiping position of the arm, beyond its neutral position, the spring forces the lever in the direction of its raised position;

in its raised position, the lever cooperates with an abutment surface of the drive head against which it is forced by the helical spring;

when the lever is raised beyond its neutral position, its nose bears against the upper web of the arm so as to force the arm in the direction of its disengaged position;

the lever and the arm are mounted on two opposite longitudinal ends, respectively front and rear, of the drive head so that when the lever is locked in the raised position it does not intersect the path of the crossmember of the arm about the axis of articulation of the arm so that the arm can be brought into its disengaged position in which it is free in relation to the lever;

for its articulated mounting on the drive head, the arm has a cylindrical transverse pivot provided with two parallel symmetrical flats, the pivot is integral with the arm and is designed to be received rotatably in a tubular ring of the drive head, the ring has a radial slot whose width corresponds to the distance between the flats on the pivot, and the flats are oriented so that the pivot can engage radially in the ring, through the slit, only when the arm is in the disengaged position, and so that the pivot is locked in the ring when the arm is in the wiping position;

the lever has, between its two front and rear ends, a longitudinal recess in which the spring is received at least partially;

the front and rear ends of the lever are connected by two parallel side members which delimit between them the longitudinal recess;

a transverse finger is arranged between the two side members of the lever, at the front end of the lever, for the attachment of the front end of the spring;

the lever is produced by plastic moulding.

BRIEF DESCRIPTION OF THE DRAWINGS

Other characteristics and advantages of the invention will emerge from a reading of the detailed description which follows, for an understanding of which reference will be made to the accompanying drawings, in which:

FIG. 2 is a plan view, in section and with cut-aways, of such a windscreen wiper;

FIGS. 3 and 4 are views in section along the respective lines 3—3 and 4—4 in FIG. 2;

FIG. 5 is a partial side view in longitudinal section of such a windscreen wiper, depicted in several positions.

DESCRIPTION OF THE PREFERRED EMBODIMENT

Figure 1:
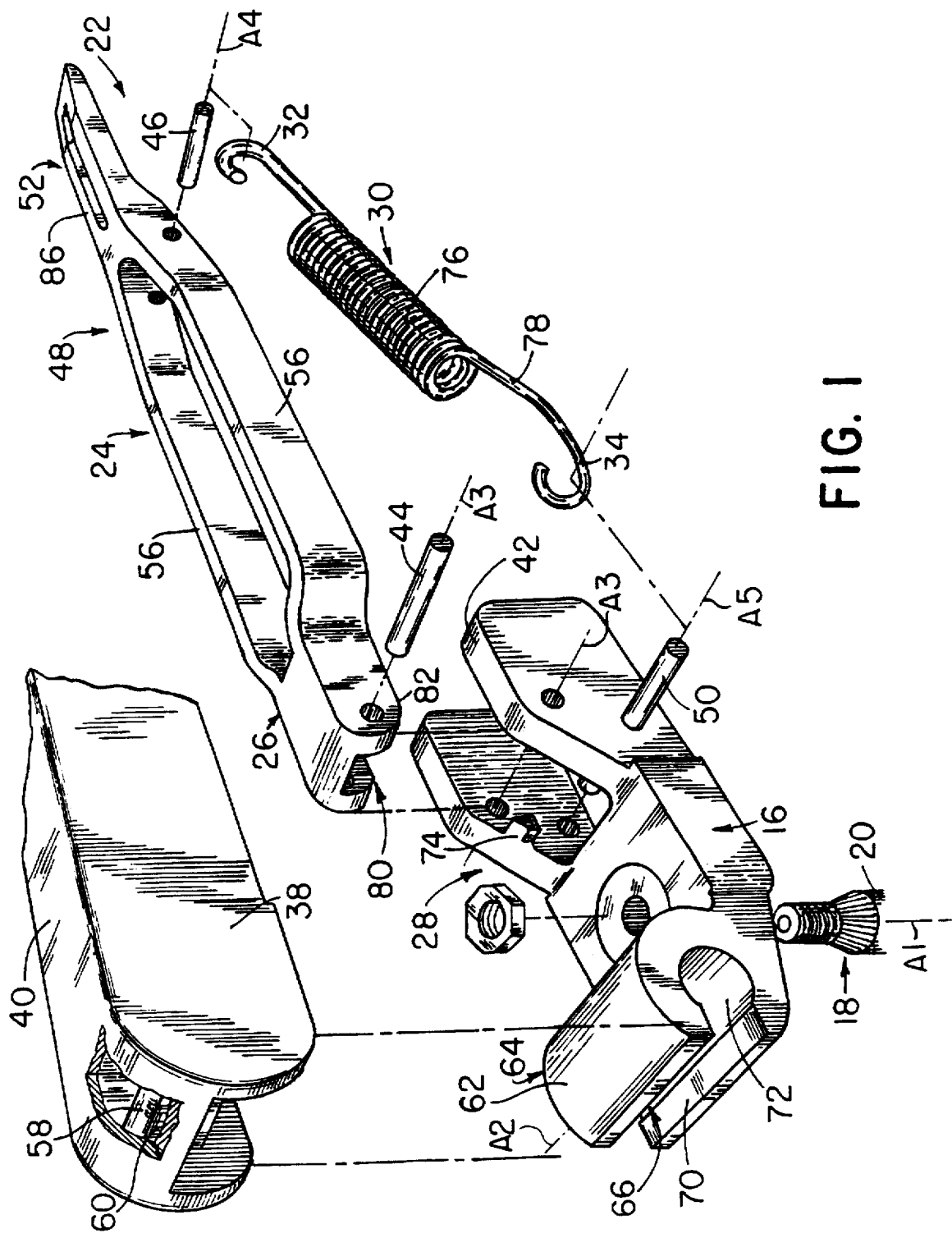
FIG. 1 is a partial view in exploded perspective of a windscreen wiper in accordance with the disclosures of the invention.

In the figures a windscreen wiper 10 for a motor vehicle has been depicted which is designed to be driven in alternate rotational sweeping motions about an axis A1 is designed to be driven in alternate rotational sweeping motions about an axis A1 substantially perpendicular to the plane of a window to be wiped (not depicted).

The windscreen wiper 10 has an arm 12 which is mounted so as to rotate, by a rear longitudinal end 14, about a transverse axis A2 substantially parallel to the plane of the window to be wiped, on a drive head 16 mounted on the upper end 18 of a shaft 20 for driving in alternate rotational sweeping motions.

The windscreen-wiper arm 12 has, at its front longitudinal end (not depicted), a windscreen-wiper blade (not depicted) which is designed to wipe the window.

In a known manner, elastic return means 22 are arranged between the drive head 16 and the arm 12 in order to force the arm 12 towards a wiping position in which it presses the windscreen-wiper blade against the window.

Controlling the contact force imposed on the blade by the arm is an essential element in obtaining effective wiping of the window.

The elastic return means 22 of the windscreen wiper 12 according to the invention have a rigid lever 24 which is articulated by a rear longitudinal end 26 on a front longitudinal end 28 of the drive head 16, and a helical spring 30 which is attached by its front end 32 to the lever 24 and by its rear end 34 to the front longitudinal end 28 of the drive head 16.

In a known manner, the elastic return means 22 are arranged in such a way that, when the windscreen wiper 10 is in the wiping position, they are arranged inside a cavity 36, open to face the window to be wiped, in the rear longitudinal end 14 of the windscreen-wiper arm 12.

For this purpose, the rear end 14 of the arm 12 has in transverse section an inverted U-shape formed by two parallel longitudinal lateral wings 38 joined by an upper transverse web 40.

This arrangement enables the elastic return means 22 to be invisible from the outside when the windscreen wiper 10 is in the wiping position.

The rear end 26 of the lever 24 is received between two lateral sides 42, parallel to the lateral wings 38 of the arm 12, of the front longitudinal end 28 of the drive head 16, and a cylindrical bar 44, introduced transversely into holes provided for this purpose, allows the lever 24 to be mounted pivotally on the drive head 16 about a transverse axis A3, between an operating position, in which it is substantially parallel to the plane of the window to be wiped, and a raised position, in which it is depicted in solid lines in FIG. 5.

The spring 30 is attached by its front end 32 to a transverse finger 46, of transverse axis A4, arranged at the front end 48 of the lever 24.

The rear end 34 of the spring 30 is attached to a transverse rod 50, of axis A5, which connects the two sides 42 of the front end 28 of the drive head 16.

In order for the spring 30 to tend to return the lever 24 towards its operating position, it is necessary for the axis A5 of the transverse rod 50 for attaching the rear end 34 of the spring 30 to the drive head 16 to be arranged between the axis A3 of articulation of the lever 24 on the drive head 16 and the window to be wiped, that is to say it is necessary that the axis A5 be arranged below the axis A3 as seen in the Figures.

According to one aspect of the invention, the lever 24 has a longitudinal nose 52 which extends the lever 24 forwards from its front end 48 and which is designed to come to bear, when the lever 24 is in the operating position and when the arm 12 is in the wiping position, against a cylindrical rod 54 which connects the two lateral wings 38 of the arm 12. The rod 54 is oriented perpendicular to the lateral wings 38 of the arm 12 and thus forms a crossmember 54.

More precisely, the longitudinal lip 52 is then received between the upper surface 40 and the crossmember 54 and, under the effect of the helical spring 30, it bears against the crossmember 54 so as to transmit to the windscreen-wiper arm 12 the contact force required to wipe the window.

In accordance with the longitudinal position of the crossmember 54 in relation to the axis of articulation A2 of the arm 12, the point of contact between the longitudinal nose 52 of the lever 24 and the crossmember 54 is modified and thus the force imposed by the spring 30 on the windscreen-wiper arm 12 is modified.

It is also possible to modify the value of this force by modifying the position of the crossmember 54 in a direction parallel to the plane of the window, which has the effect of modifying the lever arm of the force of the action of the spring in relation to the axis of articulation A3 of the lever 24 on the drive head 16.

Thus, with the same lever 24 and the same spring 30, it is possible to equip arms with different geometric configurations and to obtain, by adapting the position of the crossmember 54 on the arm 12, an appropriate contact force at the blade.

This design of the elastic return means 22 thus makes it possible to simplify the management of the production and storage of parts by reducing the number of catalogue numbers required to equip a varied range of motor vehicles.

In order to lighten the lever 24 and to provide a space for the helical spring 30, the two longitudinal ends 26, 48 of the lever 24 are joined by two parallel side members 56 between which the spring 30 is received.

The lever 24 is preferably produced by moulding, in particular from plastic material.

According to one aspect of the invention, the windscreen-wiper arm 12 is produced from plastic material and it has, for its articulation on the drive head 16, a cylindrical transverse pivot 58 of axis A2 which connects the two wings 38 and which is provided with two parallel flats 60 arranged symmetrically on each side of the axis A2 of articulation of the arm 12. The flats 60 are arranged in planes substantially perpendicular to the longitudinal direction of the arm 12.

The cylindrical pivot 58 is designed to pivot in a ring 62 arranged at the rear end 64 of the drive head 16.

The ring 62 is provided with a slot 66 with parallel faces 70, arranged in a plane substantially parallel to the plane of the window to be wiped.

The width of the slot 66 is equal to the distance between the two flats 60 on the cylindrical pivot 58 so that, for the mounting of the arm 12 on the drive head 16, it suffices to offer up the arm 12 substantially vertically so that the pivot 58 is facing the slot 66 in the ring 62, the flats 60 being arranged parallel to the faces 70, and to introduce the pivot 58 radially into the ring 62.

By bringing back the arm 12 into its wiping position, the pivot 58 pivots in the internal bore 72 of the ring 62 and, the flats 60 on the sides 70 of the slot 66 no longer being oriented in parallel, the pivot 58 is locked inside the ring 62.

According to one aspect of the invention, the axis A5 of the transverse rod 50 for attaching the rear end 34 of the spring 30 is arranged behind, as seen in the Figures, the axis A3 of pivoting of the lever 24 on the drive head 16.

Thus, when the lever 24 is raised from its operating position towards its raised position, a neutral angular position of the lever 24 exists in which the axes A3, A4 and A5 respectively of pivoting of the lever 24 and of attachment of the ends 32, 34 of the spring 30, are co-planar, so that the lever 24 is in a position of unstable equilibrium.

If the raising of the lever 24 towards its raised position is continued, the spring 30 then accompanies this movement until the rear end 26 of the lever 24 comes to bear against an abutment surface 74 arranged between the two sides 42 of the front end 28 of the drive head 16.

The lever is then locked in the raised position, in a substantially vertical position in the example embodiment depicted in the Figures.

According to another aspect of the invention, the arm 12 and the lever 24 are articulated about axes A2, A3, relatively distanced from one another on the drive head 16, so that when the lever 24 is in the raised position it is no longer capable of coming into contact with the crossmember 54, which has a very limited extent along the length of the arm 12 owing to the fact that it consists of a cylindrical rod.

Thus the arm 12 can freely continue its rotation up to its disengaged position for mounting or demounting.

In addition, the longitudinal nose 52 of the lever 24 has an upper face 86 bevelled so as not to block the relative movement of the nose 52 in relation to the arm 12, between the crossmember 54 and the upper web 40, due to the angular distance between the lever 42 and the arm 12 produced by the separation between the axes A2, A3 of articulation of the arm 12 and lever 42 on the drive head 16.

When the lever 24 has passed beyond its neutral position, the longitudinal nose 52, under the action of the spring 30, comes to bear against the inner face of the transverse web 40 of the arm 12 and tends to make the arm 12 pivot towards its disengaged position for mounting and demounting.

As can be seen in the figures, the rear end 34 of the spring 30 is connected to the turns 76 of the spring 30 by means of a length 78 which is curved so as to pass round the cylindrical bar 44 for the articulation of the lever 24 when the latter is in the raised position. With the same aim, the rear longitudinal end 26 of the lever 24 has a recess 80 in its lower face 82, turned to face the window, to allow the passage of the curved length 78 of the spring 30.

What is claimed is:

1. A windscreen wiper arm assembly for a motor vehicle, said assembly comprising an elongated windscreen-wiper arm articulated by a rear longitudinal end about a transverse axis, for movement between a wiping position and a disengaged position, on a head for driving the windscreen wiper arm assembly in alternate sweeping motions, the rear longitudinal end of the arm has two longitudinal lateral wings joined by an upper transverse web so as to form a cavity which is open to face a window to be wiped, elastic return means are provided in the cavity of the arm, between the drive head and the arm, in order to a bias the arm towards its wiping position, the elastic return means have a tension spring, which is attached, by a rear end, to the drive head and, by a front end, to a lever, said lever is mounted on a cylindrical transverse bar which connects two longitudinal sides of the drive head for movement, between an operating position and a raised position, on the drive head about a transverse axis, wherein the lever has a longitudinal nose which extends forwards from a front longitudinal end of the lever opposite to a rear pivoting end, wherein the arm has a crossmember which connects the two lateral wings of the arm, and wherein, when the arm is in the wiping position, the nose of the lever extends between the web of the arm and the crossmember on which it bears under the action of the spring.

2. The windscreen wiper of claim 1, wherein the two longitudinal sides extend forwards and between which the rear pivoting end of the lever is received.

3. The windscreen wiper of claim 2, wherein, for the attachment of the rear end of the spring, a transverse rod is provided which connects the two sides of the drive head and which is arranged longitudinally between the axis of articulation of the lever on the drive head and the window to be wiped.

4. The windscreen wiper of claim 3, wherein the transverse rod is arranged on the drive head behind the axis of articulation of the lever so that a neutral angular position of the lever exists, between its operating position and raised position, in which the attachment points of the spring and the axis of articulation of the lever are aligned and so that, when the lever is raised, from its operating position corresponding to the wiping position of the arm, beyond its neutral position, the spring forces the lever in the direction of its raised position.

5. The windscreen wiper of claim 4, wherein, in its raised position, the lever cooperates with an abutment surface of the drive head against which it is forced by the helical spring.

6. The windscreen wiper of claim 4, wherein, when the lever is raised beyond its neutral position, its nose bears against the upper web of the arm so as to force the arm in the direction of its disengaged position.

7. The windscreen wiper of claim 1, wherein the lever and the arm are mounted on two opposite longitudinal ends, respectively front and rear, of the drive head so that when the lever is locked in the raised position it does not intersect the path of the crossmember of the arm about the axis of articulation of the arm so that the arm can be brought into its disengaged position in which it is free in relation to the lever.

8. The windscreen wiper of claim 1, wherein, for its articulated mounting on the drive head, the arm has a cylindrical transverse pivot provided with two parallel symmetrical flats, in that the pivot is integral with the arm and is designed to be received rotatably in a tubular ring of the drive head, in that the ring has a radial slot whose width corresponds to the distance between the flats on the pivot, and in that the flats are oriented so that the pivot can engage radially in the ring, through the slot, only when the arm is in the disengaged position, and so that the pivot is locked in the ring 62) when the arm is in the wiping position.

9. The windscreen wiper of claim 1, wherein the lever has, between its two front and rear ends, a longitudinal recess in which the spring is received at least partially.

10. The windscreen wiper of claim 9, wherein the front and rear ends of the lever are connected by two parallel side members which delimit between them the longitudinal recess.

11. The windscreen wiper of claim 10, wherein a transverse finger is arranged between the two side members of the lever, at the front end of the lever, for the attachment of the front end of the spring.

12. The windscreen wiper of claim 1, wherein the lever is produced by plastic moulding.

* * * * *